United States Patent [19]
Hines et al.

[11] Patent Number: 6,134,876
[45] Date of Patent: Oct. 24, 2000

[54] GAS TURBINE ENGINE WITH EXHAUST EXPANDER AND COMPRESSOR

[75] Inventors: William R. Hines; Padmakar M. Niskode, both of Cincinnati; Michael W. Horner, West Chester, all of Ohio

[73] Assignee: General Electric Company, Cincinnati, Ohio

[21] Appl. No.: 08/978,812

[22] Filed: Nov. 26, 1997

[51] Int. Cl.⁷ ........................................................ F02C 7/00
[52] U.S. Cl. ........................................ 60/39.161; 60/39.41
[58] Field of Search ............................... 60/39.161, 39.41, 60/39.511, 269, 728; 415/160

[56] References Cited

U.S. PATENT DOCUMENTS

| | | | |
|---|---|---|---|
| 2,608,822 | 9/1952 | Pavlecka et al. | 60/39.161 |
| 4,950,129 | 8/1990 | Patel | 415/160 |

*Primary Examiner*—Louis J. Casaregola
*Attorney, Agent, or Firm*—Andrew C. Hess; William Scott Andes

[57] ABSTRACT

Gas turbine engines working on an inverted Brayton cycle (IBC) which provides increased power output at a same fuel flow as is currently used in some other known cycles (e.g., air bottoming cycle) are described. In one embodiment, the engine includes a compressor coupled by a first shaft to a high pressure turbine. A combustor is located in the flow intermediate the compressor and high pressure turbine. A free wheeling power turbine is located downstream of the high pressure turbine, and the power turbine is coupled to a load by a second shaft. The flow from the power turbine is supplied, e.g., via ducts, to an axial turbine coupled to an axial compressor by a third shaft. A heat exchanger is located in the flow intermediate the axial turbine and axial compressor. In operation, the working fluid (e.g., air) is compressed by the compressor, and the compressed air is injected into the combustor which heats the air causing it to expand. The expanded air is forced through the high pressure turbine and the expanded air is supplied to the power turbine. Energy from the power turbine is transferred to the load via the second shaft. At least a portion of the air flow from the power turbine is supplied to the axial turbine which operates as an expander. The expanded air flow is supplied to an inlet of the heat exchanger, where at least a portion of the air flow is cooled from, for example, 600 degrees Fahrenheit to about 89 degrees Fahrenheit. The cooled and expanded air flow is supplied to the compressor, and air from the compressor is discharged into the atmosphere.

26 Claims, 6 Drawing Sheets

GAS TURBINE ENGINE WITH EXHAUST EXPANDER AND COMPRESSOR

FIELD OF THE INVENTION

This invention relates generally to gas turbine engines and more particularly, to gas turbine engines working on an inverted Brayton cycle.

BACKGROUND OF THE INVENTION

Gas turbine engines typically include a compressor for compressing a working fluid, such as air. The compressed air is injected into a combustor which heats the fluid causing it to expand, and the expanded fluid is forced through a turbine or turbines. The compressor may include a low pressure compressor and a high pressure compressor.

In some engine applications, such as on oil platforms, a heavy penalty is paid for fuel burned because of emissions taxes. Therefore, in such applications, it is desirable to provide increased power output at a same fuel flow (i.e., decreased specific fuel consumption) as is currently used. For such applications, the engine also preferably is low in weight and has a small volume compared to other power plant installations.

One known cycle which provides increased power output as compared to a direct open cycle is commonly referred to as an inverted Brayton cycle. In an inverted Brayton cycle, the high temperature exhaust gases from a main engine are expanded from high temperature and approximately atmospheric pressure to sub-atmospheric pressure. The air is then cooled at approximately constant, low pressure, and is recompressed to atmospheric pressure and discharged.

With an inverted Brayton cycle and due to the low pressures, the engine components, and particularly the turbine and compressor, must be much larger than those of a gas turbine working on a direct open cycle with high-pressure combustion. Particularly, additional power can be generated with an inverted Brayton cycle. Further, although an inverted Brayton cycle generates higher powers with any given compressor-turbine combination, its thermal efficiency is lower than in a high temperature direct open cycle. Specifically, the inverted cycle requires a cooler, which is not necessary in the direct cycle. The cooler adds a pressure drop in the cycle and takes heat away from the cycle, which adversely affects its thermal efficiency.

It would be desirable to provide a gas turbine engine which provides increased power output at a same fuel flow as is currently used in some known applications. It also would be desirable to provide such an engine which is low in weight and has a small volume compared to other power plant installations.

SUMMARY OF THE INVENTION

These and other objects may be attained by a gas turbine engine working on an inverted Brayton cycle (IBC) which provides increased power output at a same fuel flow as is currently used in some known applications. In addition, a known gas turbine engine can be easily modified to implement the IBC, and such engine is relatively low in weight and has a small volume as compared to other power plant installations. The advantages of increased power and reduced specific fuel consumption therefore are believed to be achieved with such an engine.

More specifically, and in one embodiment, a parent or main engine includes a compressor coupled by a first shaft to a high pressure turbine. A combustor is located in the flow intermediate the compressor and high pressure turbine. A free wheeling power turbine is located downstream of the high pressure turbine, and the power turbine is coupled to a load by a second shaft.

The flow from the power turbine is supplied, e.g., via ducts, to an inverted Brayton cycle (IBC) axial turbine coupled to an axial compressor by a third shaft. A heat exchanger is located in the flow intermediate the axial turbine and axial compressor. Cooler air flow from the heat exchanger is supplied, e.g., via ducts, to the high pressure axial compressor or booster.

In operation, the working fluid (e.g., air) is compressed by the compressor, and the compressed air is injected into the combustor which heats the air causing it to expand. The expanded air is forced through the high pressure turbine and the expanded air is supplied to the power turbine. Energy from the power turbine is transferred to the load via the second shaft.

At least a portion of the air flow from the power turbine is supplied to the IBC axial turbine which operates as an expander. In one specific embodiment, the expanded air flow is supplied to an inlet of the heat exchanger at or near 4 psia pressure, where at least a portion of the air flow is cooled from about 600 degrees Fahrenheit to 89 degrees Fahrenheit. Some of the cooled gas flow is supplied to the booster. Air from the booster is discharged into the atmosphere.

DETAILED DESCRIPTION

Set forth below are exemplary configurations of inverted Brayton cycles in accordance with various embodiments of the present invention. Although specific implementations are illustrated and described herein, inverted Brayton cycles can be practiced using many alternative structures and in a wide variety of engines. Therefore, the following detailed description of various engine configurations should be understood to be exemplary only.

Figure 1:
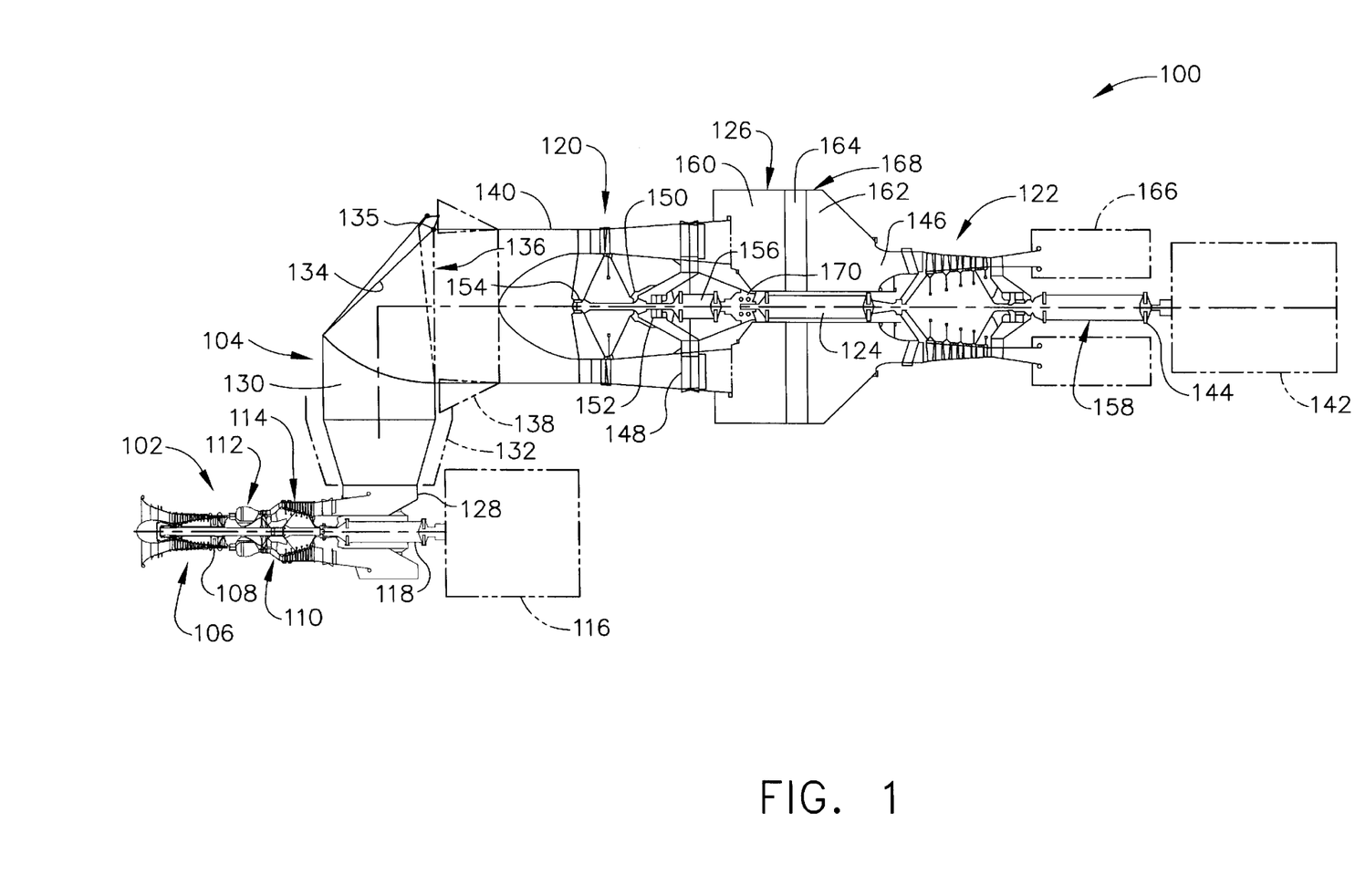
FIG. 1 is a detailed schematic view of one specific implementation of an inverted Brayton cycle in connection with an LM2500PE gas turbine engine.

FIG. 1 is a schematic illustration of one specific implementation of an inverted Brayton cycle in connection with an LM2500PE gas turbine engine commercially available from General Electric Company, Cincinnati, Ohio. It should be understood, of course, that the inverted Brayton cycle could be implemented in connection with other engines and the present invention is not limited to practice with only the LM2500PE engine.

Specifically referring to FIG. 1, engine system 100 includes an LM2500PE engine 102 modified so that exhaust from such engine 102 is supplied, via duct assembly 104, for additional work. Engine 102 includes a compressor 106 coupled by a first shaft 108 to a high pressure turbine 110.

A combustor 112 is located in the flow intermediate compressor 106 and high pressure turbine 110. A free wheeling power turbine 114 is located downstream of high pressure turbine 110, and power turbine 114 is coupled to a load 116 by a second shaft 118.

The flow from power turbine 114 is supplied, via assembly 104, to an inverted Brayton cycle (IBC) axial turbine 120 coupled to an axial compressor, or booster, 122 by a third shaft 124. A heat exchanger 164 is located in the flow intermediate axial turbine 120 and axial compressor 122. The IBC gas flow exhausts through a collector 166 to ambient pressure.

Duct assembly 104 includes an exhaust collector 128 located at the outlet of power turbine 114. The outlet of collector 128 is connected to a transfer duct 130. Since the flow out of collector 128 is distorted, with most of the flow in the aft portion of transfer duct 130, a rectangular dump diffuser 132 is provided to allow the flow field to straighten out before dumping into rectangular duct 136. A large door 134 is hingedly secured to an interface between rectangular duct 130 and a rectangular duct 136. Door 134 can be moved down to allow the LM2500PE engine discharge flow to operate as normal without the IBC. When door 134 is opened, then the discharge flow is transferred through duct assembly 104 to duct 136 to expander turbine 120. Control and operation of door 134 is described below in more detail.

Duct 136 includes a transition section 138 which causes the air flow to change over to a circular flow, and a duct 140 coupled to the outlet of duct 136 causes the airflow to transition to an annular flow before entering expansion turbine 120. Expansion turbine 120 is configured for a discharge mach number of 0.30 at 3600 rpm, and is about 103 inches in diameter with an annulus area of about 4660 in$^2$ and a loading of only 0.60. The blade height of turbine 120 is about 17.4 inches, the an$^2$ is 60.4×10$^9$, and overspeed an$^2$ is about 73×10$^9$. The temperature of the airflow into expansion turbine 120 is 991° F. with a temperature drop of 392° F. to 599° F.

Air flows from expansion turbine 120 into heat exchanger, or intercooler, 164. The ΔT across intercooler 164 is 510° F. giving 89° F. for the flow entering booster 122. The mach number of the flow entering booster 122 is 0.44 and its discharge mach number is 0.30. The exhaust stack temperature of booster 122 is 375° F. Booster 122 is coupled to a load 142 by a shaft 144.

With respect to water intercooler 164, commercially available intercooler systems that have about 3% gas side pressure loss can be utilized. In a known radial version intercooler, the hot flow enters radially inward and then exits to axial compressor 122. In a known axial flow version intercooler, the pressure is increased from 4 to 5 psia, and the diameter is increased to about 14 feet to 15 feet. Water boxes are located in region 146. There are 8 standard boxes for the flow field, and each box is supported by I beams.

Axial compressor, or booster, 122 in one specific implementation could be a scaled GE90 advanced booster. Booster 122 is selected to have a 602 lb/sec corrected airflow version with an added rear stage to give P/P=4.01. Booster 122 includes a variable inlet guide vane (vigv) to allow booster 122 to match airflow at 3600 rpm. The rotor thrust load of booster 122 is about 35,000 lbs. forward, and this thrust is absorbed by a Kingsbury bearing. The front end of booster 122 runs on a roller bearing. Booster 122 is acoustically cut off, and the exhaust of booster 122 would be good for infra-red suppression as its temperature is only about 375° F. or lower.

Figure 5A:
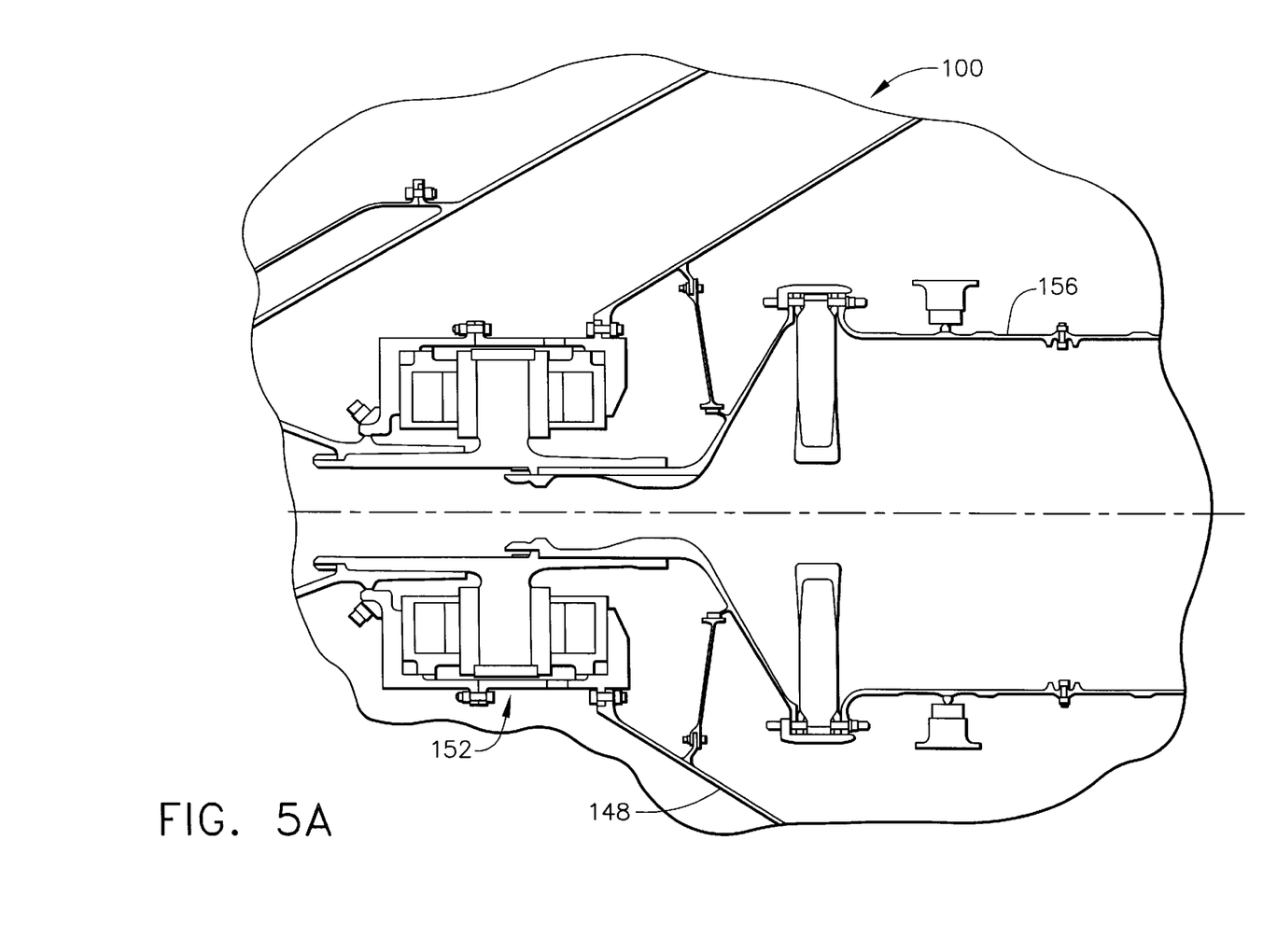
FIGS. 5A and 5B are schematic illustrations of the shaft and bearing arrangement utilized in the specific implementation shown in FIG. 1.
Figure 5B:
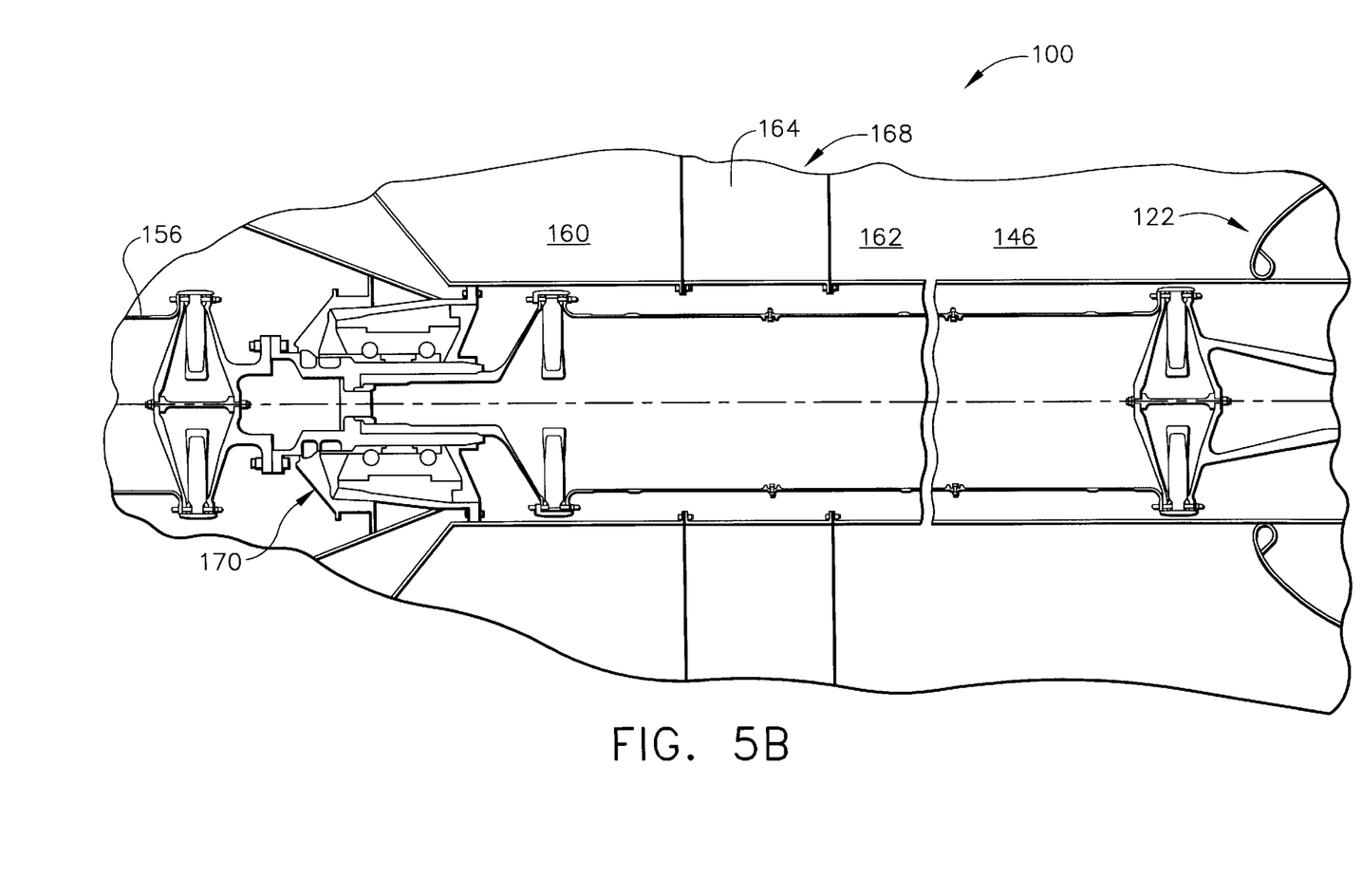

A frame 148 is set to support two bearings. A Kingsbury bearing 152 is provided to support about 50,000 lbs. of rotor thrust aft, and two bearings 170 behind Kingsbury bearing 152 are spring loaded ball bearings to stabilize the long shafting, as shown in FIGS. 5A and 5B. These two ball bearings 170 are spring loaded to about 5000 lbs. Another single roller bearing 150 is at the rear of turbine 120 in front of Kingsbury bearing 152. A single roller bearing 154 is at the front of turbine 120. Shaft 156 is a shortened version of shaft 158 which is a LM2500 flexible shaft.

Region 160 serves as a dump diffuser with the outer wall dumped to a full 14 feet. The outside flow angle from the inlet to region 160 to the outlet of region 160 is about 30° for good flow control. For region 162, the flow angle from the outlet to the inlet is about 45° for good flow control. There is about a one foot in length straight section 168 aft of region 164 between the outlet of region 164 and the inlet of region 162 to allow for flow straightening.

In engine system 100, the pressure drops are 1.5% from collector 128 to an inlet of expander 120, 2.33% from an outlet of expander 120 to an inlet of region 164, 3% across region 164, and 0.5% from an outlet of region 162 to an inlet of region 146. The booster discharge total pressure is 15.110. As shown in FIG. 1, an LM5000 exhaust collector 166, commercially available from General Electric Company, Cincinnati, Ohio, can be utilized at the outlet of booster 122. Another flexible shaft 158 connects booster 122 to a 3600 RPM generator.

Figure 2:
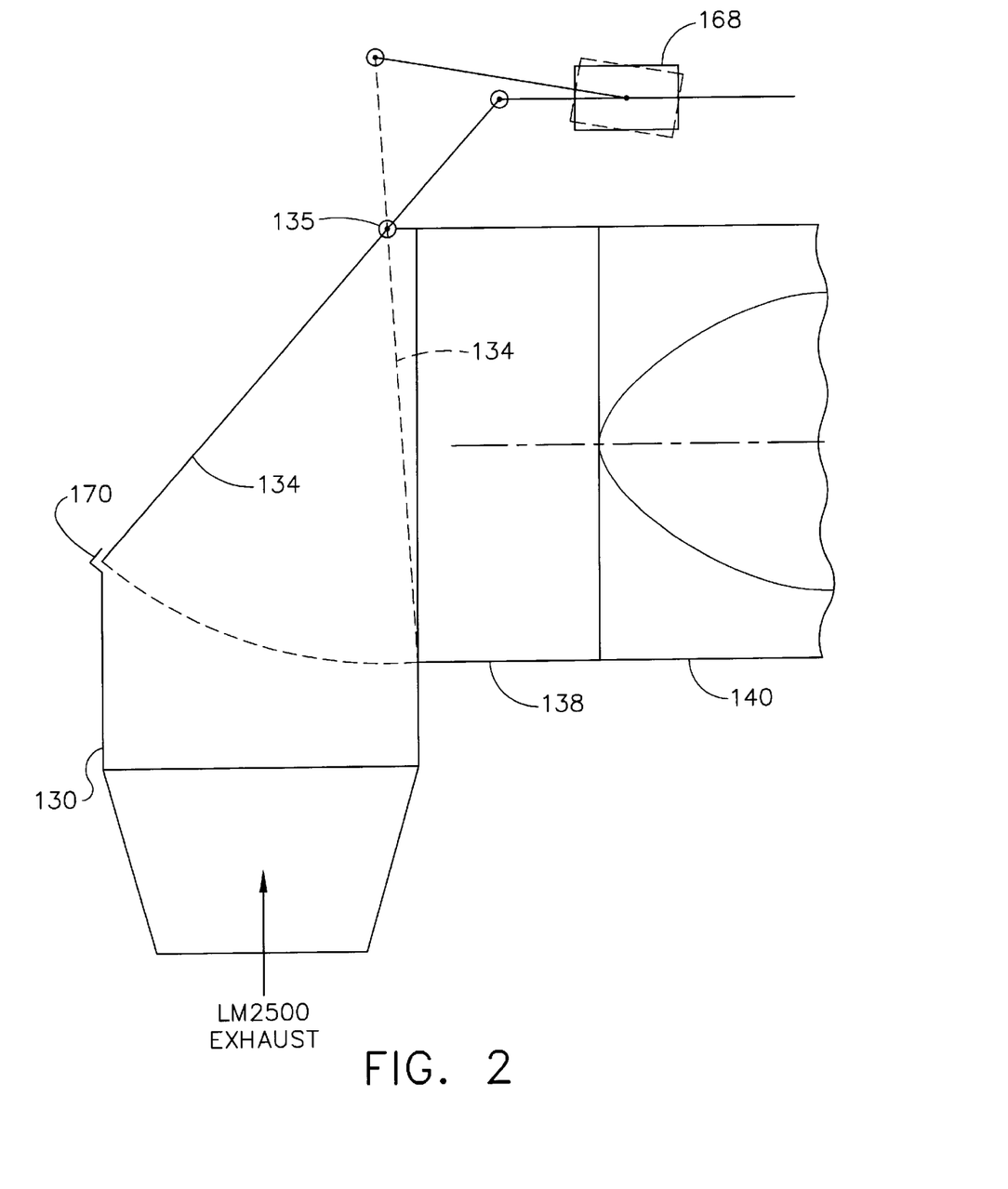
FIG. 2 is a schematic illustration of the control door shown in FIG. 1.

FIG. 2 is a schematic illustration of control door 134 shown in FIG. 1. As shown in FIG. 2, door 134 is driven by a pivotal actuator 168 around hinge 135. Actuator 168 is not exposed to the hot exhaust gases. Hinge 135 may extend across the width of door 134. Door 134 may be in a fully open position as shown in solid line, a fully closed position as shown in phantom, or in a position therebetween.

Door 134 is in an open position while IBC turbine 120 is running. The aerodynamic forces acting on door 134 when IBC turbine 120 is running force door 134 to open to an operational position. In the open position, door 134 forms a pressure seal 170 with duct 130. This pressure varies from an estimated maximum of 20.3 PSIA during starting down to about 14.88 PSIA during full power operation.

To start-up engine system 100, door 134 is either fully open or partially open. Once main engine 102 is started and is running at a synchronous no-load condition for its load, or generator, engine 102 can be accelerated to about 3% above synchronous idle core speed as door 134 is closed. Main engine 102 can be further accelerated to provide enough power for the intercooler water pumps of intercooler 164. Main engine 102 can then be controlled to higher core speeds as door 134 is fully opened to create an overpressure in front of IBC axial turbine 120. Such overpressure will cause turbine 120 to begin to rotate until turbine 120 reaches a synchronous no-load condition and is self-sustaining. Main engine 102 can then be accelerated as fast as its overtemperature will allow. IBC turbine 120 will follow the main engine airflow load so that the pressure at region 128 drops back to a point above the level as compared to that with door 134 in a closed position. Once turbine 120 is self-sustaining, turbine 120 will drive its own 3600 RPM generator and booster 122.

If an emergency shut down is required at full power, the IBC turbine speed rate of change is monitored so as to cause the pivotal actuator to close door 134. By closing door 134, the IBC mass flow will decrease immediately, thereby lowering the available horsepower to turbine 120.

Simultaneously, blow in doors in region 160 are actuated so as to vent the vacuum to atmosphere. This will cause the power turbine pressure ratio to immediately decrease as region 160 fills with ambient pressure air. If necessary, a brake could also be applied to IBC turbine 120 if the dynamics are such that door 134 and the above described blow in doors do not provide sufficiently quick shut down.

If a shaft were to break between expander 120 and booster 122 (shaft HP=15331+7091 for booster 122 and generator 142), an overspeed could be prevented by having blow-in doors located in region 160 on an outer duct. If a shaft break occurs, booster 122 and generator 142 will lose their 22422 shp and turbine 120 has an incremental acceleration shp of 22422. By sensing the speed of turbine 120, the blow-in doors could be actuated and blow-out doors (not shown) in door 134 could be actuated to allow turbine 120 to approach a loading of zero at p/p=1.0 while engine 102 is decelerated (e.g., maximum deceleration) back to a no-load condition.

With engine system 100, as compared to a typical air bottoming cycle, only one intercooler is required as compared to the two intercoolers typically required for the air bottoming cycle. In addition, in system 100, there is no large air-to-air heat exchanger, no starter, and no gearboxes. Further, no condensation is formed by system 100 except under starting for a special condition of 100% relative humidity, 100° F., 48° F. cooling seawater. The air bottoming cycle typically always has condensation which can lead to compressor blade erosion. In addition, in system 100, simple axial flow diffusers can be used rather than diffusers with 90° turns which are believed to be required in an air bottoming cycle. Also, with system 100, about 5.3 mw is output as compared to a slightly higher value for an air bottoming cycle gas turbine, and the thermal efficiency in system 100 is about 0.458 as compared to a slightly higher value for the air bottoming cycle gas turbine.

JP-4 fuel is used by the IBC described above. If the main engine were to burn natural gas fuel, the IBC recovery could amount to 3.3% more MW whereas an air bottoming cycle is independent of the fuel system used by the main engine. Further, the above described engine is low in weight and has a small volume.

Figure 3:
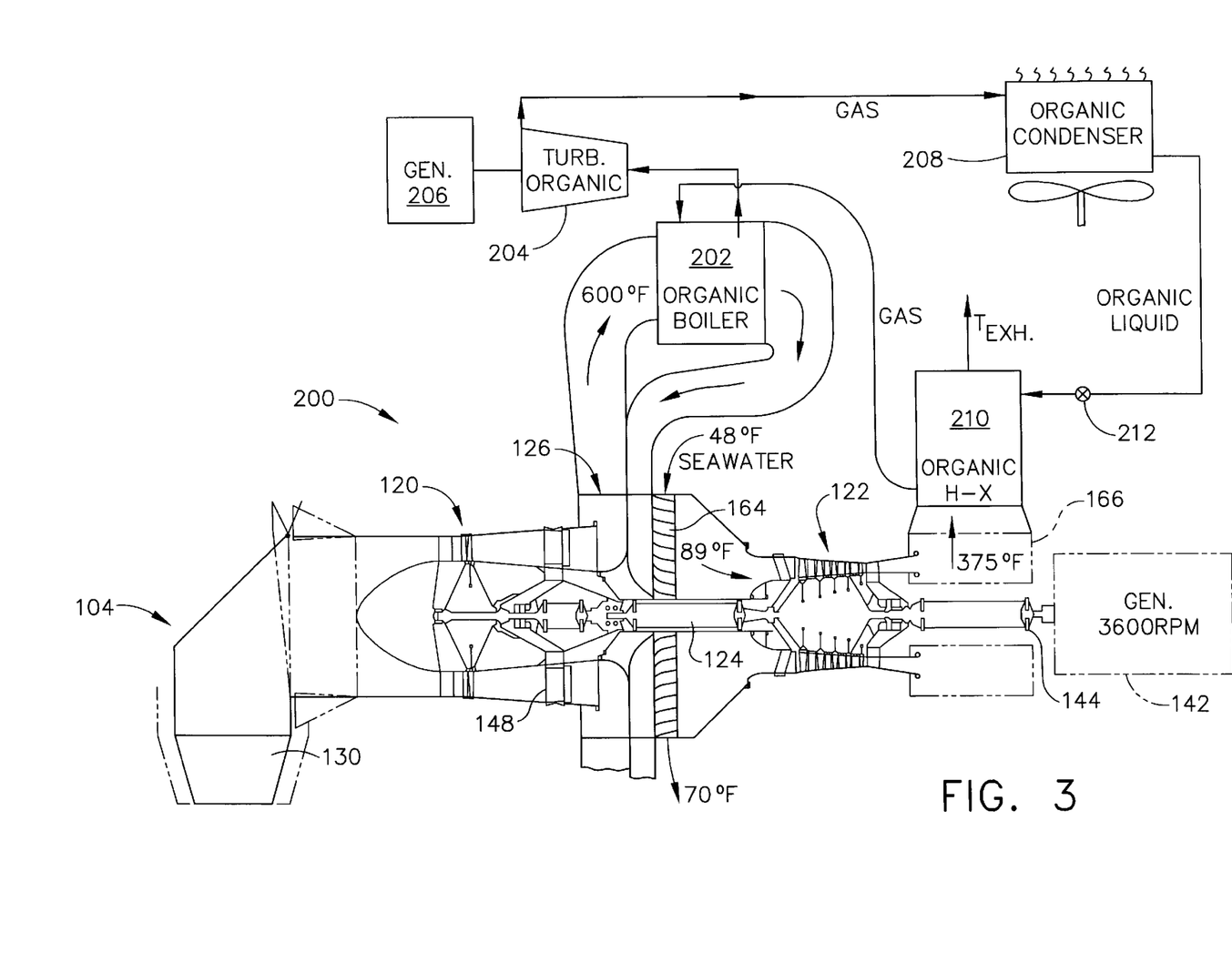
FIG. 3 is a schematic illustration of an inverted Brayton cycle in accordance with another embodiment of the present invention.

FIG. 3 is a schematic illustration of an inverted Brayton cycle 200 in accordance with another embodiment of the present invention. Components in cycle 200 which are the same as the components shown in FIG. 1 are identified in FIG. 3 using the same reference numerals used in FIG. 1. In addition, and although not shown in FIG. 3, cycle 200 would be coupled to a main engine such as main engine 102 shown in FIG. 1.

Cycle 200 includes an organic boiler 202 coupled to receive at least some of the flow from IBC turbine 120. Output flow from boiler 202 is supplied to the gas flow in cycle 200 between turbine 120 and intercooler 164. Boiler 202 also is coupled to an organic turbine 204, which drives a generator 206. Gas exhaust from turbine 204 is supplied to an organic condenser 208, and the organic liquid output by condenser 208 is supplied to an organic heat exchanger 210 via a pump 212. The organic fluid from heat exchanger 210 is supplied to boiler 202.

For industrial usage, low temperature waste heat may be recovered using organic fluid/gas. Boiler 202 may be able to reduce the flow temperature to as low as 190 degrees Fahrenheit or thereabouts. Thus, intercooler 164 is still required to lower the gas flow temperature to about 89° F. Generator 206 may run at about 3600 rpm, and a gearbox may be required to couple generator 206 to turbine 204.

Cycle 200 could recover up to 10–14% more power for the entire system shown in FIG. 1. The exhaust stack temperature could be lowered as far as 248 degrees Fahrenheit for liquid fuel or 190 degrees Fahrenheit for natural gas fuel.

Figure 4:
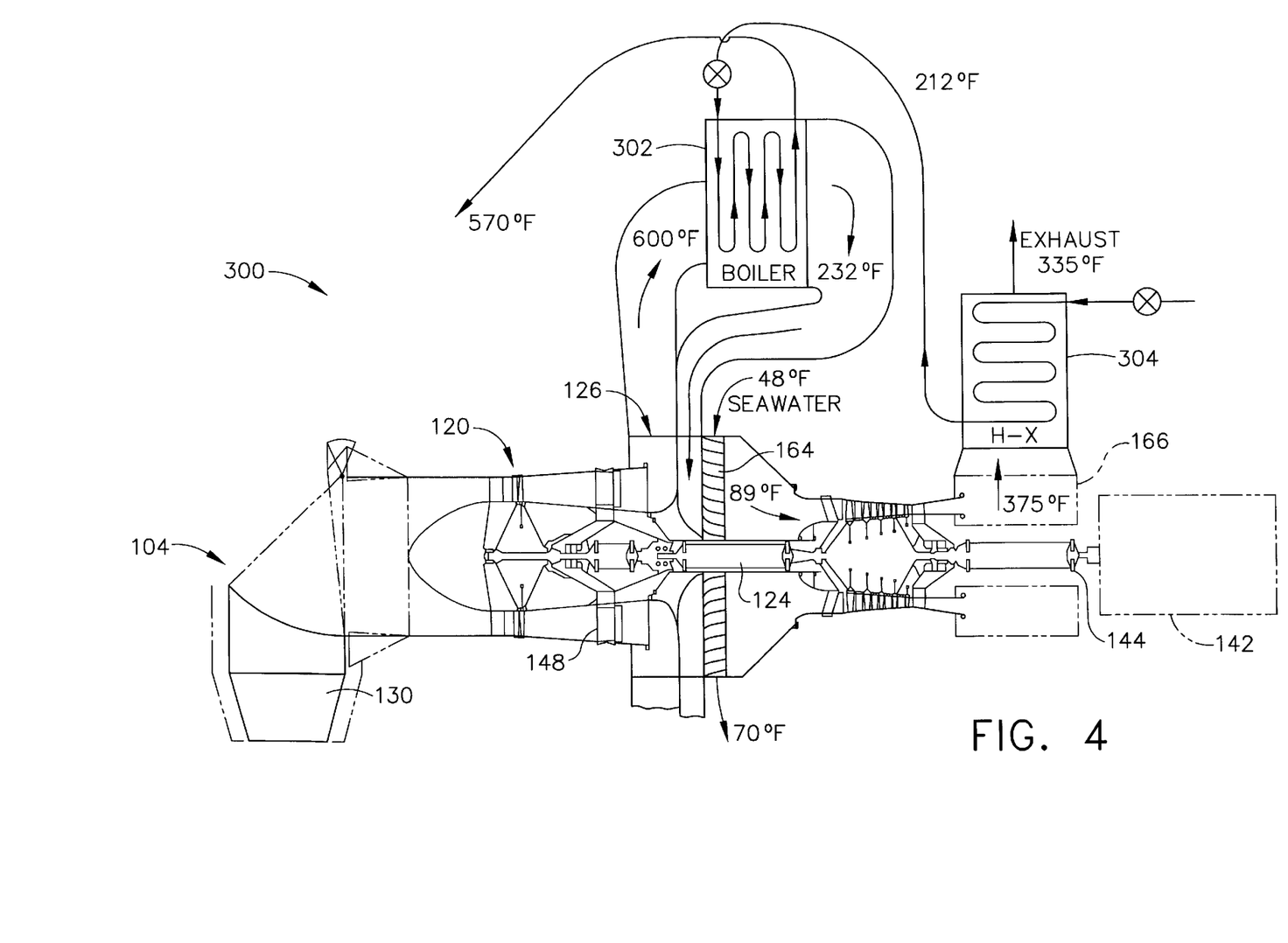
FIG. 4 is a schematic illustration of an inverted Brayton cycle in accordance with yet another embodiment of the present invention.

FIG. 4 is a schematic illustration of an inverted Brayton cycle 300 in accordance with yet another embodiment of the present invention. Components in cycle 300 which are the same as the components shown in FIG. 1 are identified in FIG. 4 using the same reference numerals used in FIG. 1. In addition, and although not shown in FIG. 4, cycle 300 would be coupled to a main engine such as main engine 102 shown in FIG. 1.

Cycle 300 includes a steam boiler 302 coupled to receive at least some of the flow from IBC turbine 120. Output flow from boiler 302 is supplied to the gas flow in cycle 300 between turbine 120 and intercooler 164. Intercooler 164 is still required to lower gas flow temperature to about 89° F. Boiler 302 also is coupled to provide steam to main engine combustor 112. A heat exchanger 304 is positioned to receive the exhaust from exhaust collector 166. At least some of the water flow from heat exchanger 304 is supplied to boiler 302.

For industrial usage, the low temperature waste heat could be recovered using the above described water-steam system. About 8.5% steam could produce about 11% more SHP from the main power turbine in the main engine, assuming that the main power turbine can handle this increased loading. It is possible that the main engine high pressure turbine flow function and the power turbine flow function would have to be increased.

Rather than delivering the steam to main engine combustor 112, the steam could be delivered to a condensing steam turbine (not shown). The exhaust stack temperature could be lowered to about 220 degrees Fahrenheit for liquid fuel and about 160 degrees Fahrenheit for natural gas fuel using a steam boiler.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A gas turbine engine, comprising:

a compressor;

a high pressure turbine coupled to said compressor by a shaft;

a combustor located intermediate said compressor and said high pressure turbine;

a power turbine downstream of said high pressure turbine;

an expander coupled to receive discharge exhaust from said power turbine;

an axial compressor coupled to said expander by a shaft; and a first heat exchanger located intermediate said expander and said axial compressor, said first heat exchanger connected serially between said expander and said axial compressor and configured to cool working fluid received from said expander prior to discharging cooled working fluid to said axial compressor.

2. A gas turbine engine in accordance with claim 1 said power turbine is a free wheel turbine.

3. A gas turbine engine in accordance with claim 1 wherein said power turbine is coupled to a load by a shaft.

4. A gas turbine engine in accordance with claim 1 wherein said first heat exchanger is an intercooler.

5. A gas turbine engine in accordance with claim 1 wherein said axial compressor discharges to atmosphere.

6. A gas turbine engine in accordance with claim 1 further comprising an organic boiler coupled to receive an output of said expander.

7. A gas turbine engine in accordance with claim 6 further comprising an organic turbine coupled to said organic boiler, an organic condenser coupled to said organic turbine, and an organic heat exchanger coupled to said organic condenser and to said organic boiler, said organic heat exchanger positioned to receive exhaust from said compressor.

8. A gas turbine engine in accordance with claim 1 further comprising a steam boiler coupled to receive an output of said expander.

9. A gas turbine engine in accordance with claim 8 further comprising a steam boiler coupled to said combustor and configured to receive steam from said first heat exchanger.

10. A gas turbine engine in accordance with claim 8 further comprising a steam boiler coupled to a condensing steam turbine and configured to receive steam from said heat exchanger.

11. An engine system, comprising:
- a gas turbine engine comprising a compressor, a high pressure turbine coupled to said compressor by a shaft, a combustor located intermediate said compressor and said high pressure turbine, and a power turbine downstream of said high pressure turbine;
- an inverted Brayton cycle apparatus comprising an expander coupled to receive discharge exhaust from said power turbine, an axial compressor coupled to said expander by a shaft, and a first heat exchanger located intermediate said expander and said axial compressor, said first heat exchanger connected serially between said expander and said axial compressor and configured to cool working fluid received from said expander prior to discharging cooled working fluid to said axial compressor; and
- a duct assembly for supplying discharge exhaust from said power turbine to said expander.

12. An engine system in accordance with claim 11 where said duct assembly comprises an exhaust collector at an outlet of said power turbine, a transfer duct connected to an outlet of said collector, and a dump diffuser to straighten the air flow through said transfer duct.

13. An engine system in accordance with claim 12 wherein said duct assembly further comprises a rectangular shaped duct coupled to an outlet of said transfer duct.

14. An engine system in accordance with claim 12 wherein said duct assembly further comprises a door for opening and closing the air flow path through said duct assembly between said engine and said inverted Brayton cycle apparatus.

15. An engine system in accordance with claim 12 wherein said duct assembly further comprises a first transition section which causes the air flow to change over to a circular flow, and a second transition section which causes the airflow to transition to an annular flow before entering said expander.

16. An engine system in accordance with claim 11 said power turbine is a free wheel turbine.

17. An engine system in accordance with claim 11 wherein said power turbine is coupled to a load by a shaft.

18. An engine system in accordance with claim 11 wherein said first heat exchanger is an intercooler.

19. An engine system in accordance with claim 11 wherein said axial compressor discharges to atmosphere.

20. An engine system in accordance with claim 11 wherein an outlet of said axial compressor is coupled to a second heat exchanger, and an outlet of said second heat exchanger is coupled to a boiler.

21. An engine system in accordance with claim 11 further comprising an organic boiler coupled to receive an output of said expander, an organic turbine coupled to said organic boiler, an organic condenser coupled to said organic turbine, and an organic heat exchanger coupled to said organic condenser and positioned to receive exhaust from said compressor.

22. An engine system in accordance with claim 11 further comprising a steam boiler coupled to receive an output of said expander with a return to said first heat exchanger, and a heat exchanger positioned to receive exhaust from said compressor and coupled to said steam boiler.

23. An engine system in accordance with claim 11 wherein said expander is configured to operate at 3600 RPM.

24. An engine system in accordance with claim 11 wherein said axial compressor comprises variable inlet guide vanes.

25. An engine system in accordance with claim 11 further comprising a flexible shaft coupling said expander and said axial compressor, and spring loaded ball bearings for supporting said shaft.

26. An engine system in accordance with claim 11 wherein said expander is configured to have a pressure at an outlet selected to be about 4 psia.

* * * * *